Figure 1:
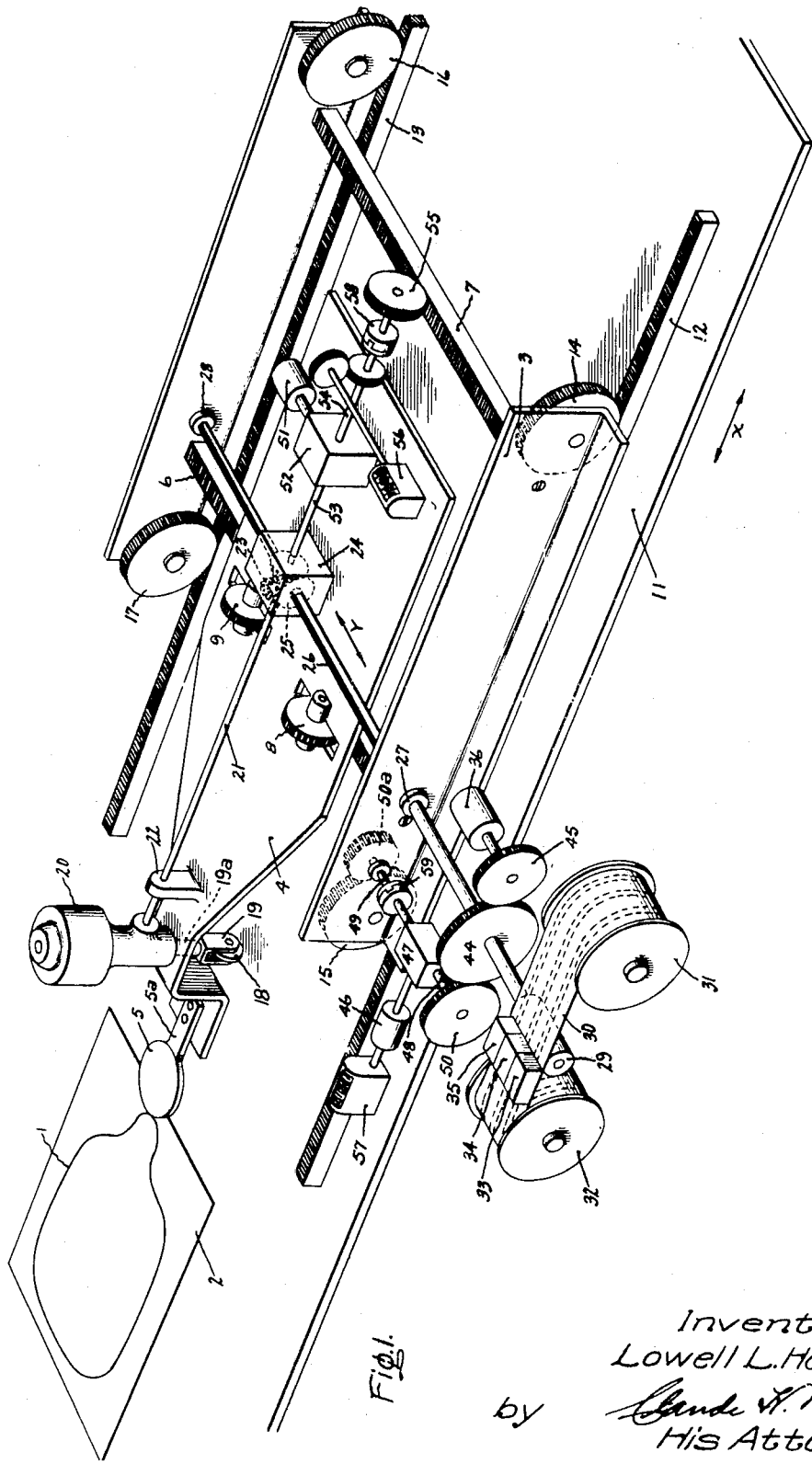

July 17, 1956

L. L. HOLMES, JR 2,755,160

MAGNETIC TAPE RECORDING DEVICE

Filed March 30, 1953

2 Sheets-Sheet 1

Inventor:
Lowell L. Holmes, Jr.
by
His Attorney.

July 17, 1956  L. L. HOLMES, JR  2,755,160
MAGNETIC TAPE RECORDING DEVICE
Filed March 30, 1953  2 Sheets-Sheet 2
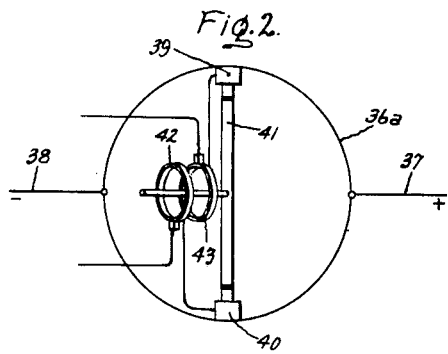
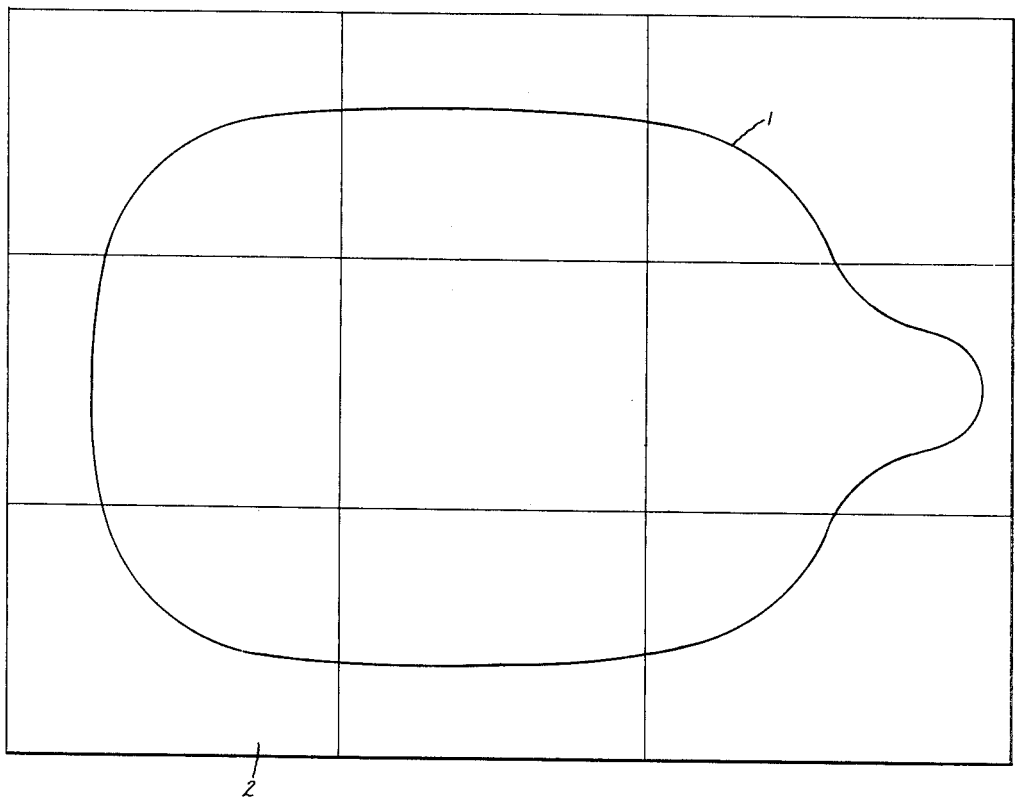
Inventor:
Lowell L. Holmes, Jr.
by  *Claude N. Mott*
His Attorney.

United States Patent Office 2,755,160
Patented July 17, 1956

2,755,160

MAGNETIC TAPE RECORDING DEVICE

Lowell L. Holmes, Jr., Schenectady, N. Y., assignor to General Electric Company, a corporation of New York Application March 30, 1953, Serial No. 345,628

3 Claims. (Cl. 346—8)

This invention relates to control systems for recording a program of sequential operations involving time-motion patterns and other types of automatic cycles, and playing back the recording to cause the recorded program to produce a corresponding sequence of operations.

More particularly, the invention relates to control systems in which such sequence of operations is recorded on a magnetic tape as a control alternating voltage of which the phase relationship with respect to a reference alternating voltage, also recorded on the tape, varies with the instant to instant progress of the program which is being recorded, and it has for an object the provision of an improved device for recording the program on the tape.

Still more particularly, this invention relates to systems for automatically controlling a machine tool to produce a piece of work by means of a recording on a magnetic tape of an alternating reference voltage and one or more control voltages of variable phase relationship with respect to the reference voltage. A system of this character is disclosed in Patent 2,537,770—Livingston et al. In the operation of the Livingston et al. system, a skilled machine tool operator manually controls the machine tool to produce a sample piece of work of which duplicates are subsequently to be made by the machine tool under automatic control of a magnetic tape. Either prior to or during this initial manual operation of the machine tool, an alternating reference voltage is obtained from a source of constant frequency and is recorded on the tape while it is running at constant speed. For each controlled element of the machine tool, such, for example, as its cross feed and its longitudinal feed, a control alternating voltage of which the instant to instant phase relationship with respect to the reference voltage represents the instant to instant position of such controlled element is produced by means of a selsyn geared to such controlled element and excited from the constant frequency source. This control voltage is also recorded on the tape while it is running at constant speed.

When the tape is played back to effect automatic control of the machine tool to duplicate the original sample work piece made by manual control, the instant to instant phase relationships of the recorded control voltage and the selsyn voltage with respect to the reference voltage are compared by means of an electronic amplifier. Any difference in these phase relationships at any instant of time represents an error between the required position of the controlled element of the machine tool at such instant and its actual position. The electronic amplifier responds to any such difference in these phase relationships to produce an error voltage which is utilized to initiate and control a correction in the position of the controlled element.

Control systems of this general character have also been proposed in which the control voltages which are to be recorded on the tape are obtained from a drawing of the work piece by means of a curve follower and a selsyn driven thereby. In these systems, the reference voltage and the control voltages are also recorded while the tape is running at constant speed. The contour of the drawing which is being traced may contain numerous sharp corners, short radius curves and reversing curves which require the operator frequently to slow down the curve tracing operation in order to trace the contour accurately. During the playback operation, the tape is run at the same constant speed as that at which it was run during the recording operation. Consequently, such systems have the disadvantage that playback operation requires the same length of time that was required for the slow, careful and painstaking recording operation. Thus the machine tool in producing work pieces under automatic control of the tape duplicates all the slow-downs which the operator found necessary to introduce into the recording operation in order to effect accurate tracing of the contour, and thus during playback the machine tool is not worked at its maximum speed. Consequently, a further object of this invention is the provision of an improved recording device which during the recording operation correlates the speed of the tape with the speed of movement of the tracer element of the curve follower along the contour which is being traced. In other words, the recording device of this invention varies the speed of the tape during recording to match the operator's slow-downs in the speed of tracing the contour. Thus when the tape is played back at its normal constant speed, the controlled machine tool will be operated at its maximum speed throughout its complete operating cycle.

In carrying this invention into effect in one form thereof, there is provided a multi-channel recording head having a plurality of coils for recording alternating voltages on a magnetic tape. A capstan is provided for driving the tape past the recording head. A plotting board is provided upon which is mounted a scale drawing of a part to be produced on a machine tool, together with a mechanical curve follower which may be either of the manually operated or motor driven type. Mounted on the plotting board is a device for resolving the contour following motion into X coordinate and Y coordinate components. This device comprises an X coordinate carriage and a Y coordinate carriage which is mounted for movement in a direction at right angles to the direction of movement of the X coordinate carriage.

The tape driving capstan is driven by means of a shaft which is driven by the curve follower at a speed proportional to its speed along the contour of the part on the drawing. A device for producing a sine wave alternating reference voltage is also driven by this shaft and is electrically connected to one of the coils of the recording head. Sine wave alternating voltage generators each driven through mechanical differential devices jointly by the curve follower and one or the other of the X or Y coordinate carriages and each electrically connected to a corresponding coil of the recording head cause to be recorded on the tape sine wave control alternating voltages which at any instant are phase displaced from the reference voltage by an amount proportional to the amount of movements of the carriages from their 0—0 starting points.

For a better and more complete understanding of the invention, reference should now be had to the following specification and to the accompanying drawing of which Fig. 1 is a simple diagrammatical sketch in perspective of an embodiment of the invention; Fig. 2 is a simple electrical schematic diagram of a detail of the invention, and Fig. 3 is a diagrammatical illustration of a scale enlargement drawing such as is used on the plotting board to be traced by a curve follower. It contains divisions which facilitate an understanding of a technique which makes it possible to use a drawing many times larger than the plotting board itself, thus to secure a high degree of accuracy of reproduction.

Referring now to the drawing, a scale drawing 1 of a part to be reproduced by a machine tool such for example as a milling machine (not shown) is mounted on a plotting board 2. Either adjacent the plotting board or formed integrally therewith is a device for resolving contouring motion around the outline of the part on the drawing into X and Y coordinate component motions. This device comprises an X axis of coordinates carriage 3 and a Y axis of coordinates carriage 4. Attached to the left-hand extremity of the Y coordinate carriage 4 is a tracer element 5 which has a conformation which is a scale outline of the cutting tool of the controlled machine tool. In Fig. 1, the tracing element 5 is illustrated as having a scale outline of a cutting tool which in this case is assumed to have a circular cross section to correspond to the cross sectional area of a rotary cutting tool such, for example, as a milling cutter. This tracer element may be made of any suitable transparent plastic material such, for example, as cellulose acetate or ethyl acetate in order that the circular outline may be continued across the neck 5a which serves as a means of attachment to the Y axis carriage.

As shown, the Y axis carriage is mounted for transverse movement on the X axis carriage by means of racks 6 and 7 and pinions 8, 9 and 55. Similarly, the X axis carriage is mounted on a supporting table 11 for movement in a direction at right angles to the direction of movement of the Y axis carriage by means of racks 12 and 13 and pinions 14, 15, 16 and 17.

At the left-hand end of the Y axis carriage, a steering and propelling friction wheel 18 is mounted in a housing member 19 which is swivel supported on the carriage. The friction wheel is driven by a variable speed motor 20 through suitable gearing and shafting (not shown) which mechanically connects the rotor of the motor with its axle. By adjusting the field strength of this tracing head motor, its speed and consequently the speed of rotation of the propelling wheel 18 may be adjusted to any desired value.

By reason of its swivel support, the wheel 18 may be turned about an axis perpendicular to the plane of the supporting table, i. e. about its vertical diameter. A shaft 21 is mounted for rotation in a bearing 22 which is mounted on the Y axis carriage. One end of the shaft is mechanically connected through suitable gearing (not shown) to be driven by the tracing head motor 20, and the other end is connected to the driving pinion 23 of a bevel gear box 24 which is also mounted on the Y axis carriage. Meshing with a gear 23 is a gear 25 which is mounted on a shaft 26 which is disposed at right angles with respect to shaft 21 and which is mounted for rotation in suitable bearings 27 and 28 on the X axis carriage. The gear 25 and the shaft 26 are splined to provide for driving the shaft by the tracing head motor 20 irrespective of the position of the Y axis carrage on the X axis carriage.

The splined shaft 26 is provided at one end with a capstan 29 which constitutes the driving member for a multi-channel magnetic tape 30. This tape is initially wound upon a storage or unwinding wheel 31. The unwinding end of the tape is threaded through a recording head and is attached to the drum of a take-up reel 32. The winding up reel is driven by suitable driving means, such as an electric motor and tension is maintained in the tape by means of an electric motor coupled to the unwinding reel and driven thereby as a generator to provide regenerative braking. The motors for the reels constitute no part of the present invention and consequently, in the interest of simplicity they are omitted from the drawing. In addition to the capstan, the recording head comprises a plurality of recording coils 33, 34 and 35 each mounted in a suitable supporting means in inductive relationship to the tape. Tension is maintained in the tape by suitable means such as a torque motor (not shown) mechanically connected to the take-up reel and a braking generator (not shown) mechanically coupled to the unwinding reel. This tension means constitutes no part of the present invention and for this reason it is omitted from the drawing. The reels 31 and 32 and the recording head are illustrated as being mounted on the X axis carriage. However, this is not essential. These parts could be mounted on a stationary support in any convenient location and the driving connection between the shaft 26 and the tape driving capstan completed by a suitable electrical motion transmitting and receiving system, such, for example, as a selsyn transmitter and receiver electrically connected together.

Also mounted on the X axis carriage is a generator 36 for producing a sine wave alternating reference voltage. This generator may take several different forms. For convenience, it is illustrated as a sine wave potentiometer which is a readily available device that is used in computing mechanisms and other devices. It comprises a continuous circular wire wound resistor element supported in a suitable frame. Its electrical connections are illustrated in Fig. 2 in which diametrically opposite points of the resistor element 36a are connected across a source of direct voltage which is represented by the supply conductors 37 and 38. A pair of brushes 39 and 40 are mounted upon a rotor member 41 and are disposed to make contact with the resistor element at diametrically opposite points. Connections from these brushes are brought out through slip rings 42 and 43. As the rotor is rotated through 360°, a sine wave alternating voltage appears at the slip rings of which the frequency is proportional to the speed of rotation of the rotor. This form of generator makes it possible to generate low frequency sine wave voltages by mechanical rotation of a shaft.

The rotor of the sine wave voltage potentiometer is mechanically connected to the capstan shaft 26 by means of gears 44 and 45 and the slip rings are electrically connected to the coil 33 in the recording head by means of electrical connections (not shown). Thus, when the tracer element 5 of the curve follower is moved along the contour on the drawing, there is recorded on the tape a reference sine wave alternating voltage having a constant number of cycles per unit length of the tape. It is preferred that the frequency of this reference voltage shall be approximately 400 cycles per second when the tape is running at a speed of 7½ inches per second, or one cycle per .01875 inch of the tape. Since the rotor of the sine wave voltage potentiometer and the tape driving capstan are geared together, the ratio of one cycle of the reference voltage per .01875" of the tape is maintained irrespectively of how fast or how slowly the tracer element of the curve follower is moved along the contour on the drawing. In other words, this sine wave generator will generate a frequency which is in direct ratio to the operator's speed of following the contour on the drawing. Since the frequency of the magnetizing pattern on the tape has a synchronous ratio to tape speed, change of speed by the operator in following or stopping, or any other erratic behavior will have no effect on the frequency of the playback signal. Thus when the tape is subsequently played back at a constant speed of 7½ inches per second, the frequency of the reference voltage will be 400 cycles per second.

Also mounted on the X axis carriage is a sine wave voltage generator 46 which is identical with the generator 36. Its rotor shaft is mechanically connected to be driven by the output element of a mechanical differential device 47 having first and second input element shafts 48 and 49. The input shaft 48 is provided with a gear 50 which meshes with gear 44 on the capstan shaft. The input shaft 49 is provided with a pinion gear 50a which meshes with the pinion 15, and thus adds the component of motion of the X axis carriage into the motion of the output shaft. The slip rings of the X axis sine wave generator 46 are connected to the recording head coil 34 by means of electrical connections (not shown). If the input shaft 49 were disconnected from its drive pinion and locked, motion of the curve follower would cause to be recorded by coil 34 in the corresponding channel on the tape a sine wave alternating voltage having the same fundamental frequency as the reference voltage. However, since the input shaft 49 is driven by its pinion, the frequency of the voltage generated by generator 46 is either increased or decreased with respect to the frequency of the reference voltage, depending upon the direction of motion of the X axis carriage. Consequently, there is recorded on the tape by the coil 34 a sine wave control voltage of which the instant phase with respect to the reference voltage varies in proportion to the amount of X axis component motion of the curve follower.

On the Y axis carriage is mounted a sine wave voltage generator 51 which is identical with the generators 36 and 46. Its rotor shaft is mechanically connected to the output shaft of a mechanical differential device 52 which is also mounted on the Y axis carriage. A first input element shaft 53 is connected through the gear box 23 to be driven by the capstan shaft, and a second input shaft 54 is provided with a pinion 55 which meshes with the Y axis rack 7. The slip rings of the generator 51 are electrically connected by means of electrical connections (not shown) to the recording head coil 35. Thus when the tracing head of the curve follower is moved, there is recorded in a corresponding channel on the tape a control sine wave voltage of which the instant to instant phase relationship with respect to the reference voltage varies with the amount of Y axis component motion of the curve follower.

Mechanical counters 56 and 57 are connected to the pinions 50 and 55 on the X axis and Y axis carriages respectively to indicate the integrated amount of motion of the X and Y carriages from a 0—0 reference or starting point. These counters may have gearing ratios such that one digit in the unit column corresponds to a unit of displacement of its carriage along its axis of an amount such, for example, as .001 inch. The digits in the remaining columns of the counters will then represent inches, tenths and hundredths.

With the foregoing understanding of the elements of the invention and their organization its operation will readily be understood from the following detailed description.

The operator places on the plotting board a scale drawing of the object or part which is to be reproduced by the machine tool. It is not necessary to locate the drawing accurately in any predetermined position on the board. However, if the machine tool which is to be controlled is a lathe, it is desirable to orient the drawing angularly on the plotting board so that the sides of the square corners of the scale drawing line up with the respective X and Y axes of the plotting board since they are indicative of the X and Y axes of the machine tool.

Next the operator references the cutting tool outline of the tracing element 5 with respect to the outline of the scale drawing as being indicative of the starting point of machining the actual work piece. The X and Y axis counters are set to 0—0 or any other numbers which are indicative of a reference point which can be set later on the actual machine tool. Either at this point in the operation or earlier in the preparation stage of the scale drawings, predetermined X and Y coordinates of the drawing may be designated as "check points" to insure that the critical dimensions of any parts are recorded with greater precision than that afforded by mere scale enlargement of the drawing.

Having completed the initial setup of the cutting tool outline with respect to the contour of the part on the drawing, the operator follows the contour on the drawing with the outline of the cutting tool on the tracer element 5. To do this, he variably depresses a foot pedal speed control associated with the motor 20 to vary the speed of following the scale drawing to match his sensing and steering ability, and at the same time he steers the friction wheel 18 manually by grasping the vertical portion 19a of the housing member 19 and rotating the housing about its vertical axis as is necessary to maintain the outline of the cutting tool on the tracer element 5 in contact with the contour on the drawing.

As the tracer element follows the contour of the drawing, the sine wave alternating voltage generator 36 is driven by the tracing head motor 20 at a speed which is proportional to the speed of the tracer element along the contour of the drawing. Thus there is recorded on the tape, a sine wave alternating reference voltage having a frequency of which the number of cycles per unit length of the tape remains constant at a predetermined value e. g. .01875 irrespective of the speed at which the tracer is moved along the contour and consequently irrespective of how fast or slowly the tape is moved during the recording operation.

Simultaneously the X axis and Y axis carriages 3 and 4 resolve the movement of the tracer element along the contour into X axis and Y axis components. As a result, the X axis and Y axis generators 46 and 51 generate and cause to be recorded upon the tape sine wave alternating control voltages of which the instant to instant phase relationships with respect to the reference voltage vary with the amounts of these component movements. Thus the number of cycles of these control voltages per unit length of the tape depend upon the amounts of the component movements along the X and Y axes and are independent of how fast or how slowly the tracing operation is accomplished.

Through the proper selection of gear ratios between the elements of the system, the operator can program a complete sequence of machining operations at a rate consistent with his ability to think and execute commands to the control. Upon playback, the speed of execution of the record will be constant at a selected speed which is preferably the maximum speed at which the machine can produce satisfactory parts. This constant speed need not remain at the same value during an entire sequence of operations. Selection of this constant speed is at the operator's discretion by a change in gearing ratio made during the making of a record.

In the apparatus described, the phase relationships of the sine wave patterns of magnetization in the $x$ and $y$ channels of the magnetic tape with respect to the sine wave pattern of magnetization in the reference channel. These phase relationships are functions both of the instantaneous speed components of the time integrated motions of the components of motion which are to be executed by the machine tool when the tape is played back. As previously described, when played back a recording made by this invention requires the machine tool to operate at maximum capability, i. e., at full speed irrespectively of how slowly the recording was made. The necessary implication of this requirement is that at the start of the playback program, the controlled machine tool must be accelerated from rest to full speed in zero time. Since no physically realizable machine can be accelerated from rest to full speed in zero time, the recording must be made in such a manner that the machine tool can be programmed from standstill to optimum speed at an acceleration which is within the capacity of the control if accurate results are to be obtained and falling out of step is to be avoided.

This can be accomplished in the following manner. Rotation of the motor driven tracer head wheel 18 is proportional to the number of cycles of alternating polarity magnetization in the reference channel per unit length of the tape. If wheel 18 is driven but the gimbal 19 is restrained from movement so that the wheel 18 is required to slip on the plotting board, the frequencies of the sine wave patterns of magnetizations in the $x$ and $y$ channels be the same as that of the reference channel magnetization and consequently their phase relationships will remain unchanged. This corresponds to the condition of zero speed of both $x$ and $y$ axis motions during playback. By causing the slippage of the wheel progressively to lessen as it engages the plotting board, the effect of a smoothly changing ratio between the cycles of the $x$ and $y$ channels per unit length of tape and the cycles of the reference channel per unit length of tape is achieved. Upon playback, this is equivalent to a controlled acceleration from standstill to maximum or optimum speed of the machine tool. The degree of perfection of the results obtained will, of course, depend upon the skill of the operator and will improve with practice.

Once a satisfactory record of such an acceleration of a given machine tool has been produced, it may be used on all subsequent playback operations of that machine tool by splicing this segment of the tape ahead of a tape upon which a recording has been made in the usual manner with zero slippage between the power driven wheel 18 and the plotting board. Alternatively, copies of this acceleration curve can be made by methods now known to the art and an individual copy spliced to the beginning and end of each new tape recording of a program of operations of such machine tool.

One of the most useful features of this device is the fact that the plotting board's physical size need not be in direct ratio to the scale selected between the drawing and the size of the finished parts. This is accomplished by back spacing and sectionalizing the scale drawing.

For example assume a plotting table which has a useful area of 2' x 4'. It may be necessary that the scale drawing shall be 6' x 12' in order to obtain the necessary degree of accuracy. In this example each dimension of the drawing is three times the corresponding dimension of the table. The drawing 1 may be divided into 9 pieces as illustrated in Fig. 3, and the coordinates of the contour line where it leaves or enters each of the sections of the drawing are noted. Starting on section 1, the tracer element runs off the section at the indicated coordinates. The operator then leaves the settings on the X and Y axis revolution counters, disengages the friction wheel 18 from the table, disengages the rack and pinion drive clutches 58 and 59 and slides the carriage assembly to the opposite corner of the table. This operation is referred to as "back-spacing." During this time no voltages are being recorded upon the tape.

Section 2 of the scale drawing is then mounted on the table and the operator after reengaging the rack and pinion clutches continues tracing the section of the contour on section 2 from the reference coordinates noted at the end of section 1 and continues following the lines on the contour on section 2 until the tracer element again runs off the paper at the indicated coordinates. This operation is continued from one section to the other until the contour of the part on the drawing is traced back to the starting point, i. e., the 0—0 reference point.

It will be observed that this makes possible scale ratios of 100 to 1 or even 1000 to 1 without the disadvantage of extreme size of the plotting table.

Another advantage of this device is that the operator knows where a particular program of motion begins and ends on the tape. Stopping the tracing operation around the scale drawing at a particular setting of the X and Y axes revolution counters, he can mark the tape under the recording heads with a pencil notation or coded punch. This will permit editing and splicing to such a degree of accuracy that little or no mismatch would occur during playback.

Although in accordance with the provisions of the patent statutes, this invention has been explained as embodied in concrete form, and the principle has been explained together with the best manner in which it is now contemplated applying that principle, it will be understood that the disclosure of the drawings and spicification is merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States is:

1. In combination a plural channel recording head having a plurality of coils for recording alternating voltages in corresponding channels on a magnetic tape, a tape driving capstan, a mechanical curve follower having a member connected to drive said capstan at a speed proportional to the contouring speed of said curve follower, a first alternating voltage generator driven by said member for generating an alternating reference voltage and electrically connected to one of said recording head coils, a device for resolving the contouring motion of said curve follower into components comprising a second member driven by said curve follower at a speed proportional to the speed of one component of said motion and a third member driven by said curve follower at a speed proportional to the speed of a second component disposed perpendicular to said first component, second and third alternating voltage generators electrically connected to corresponding recording coils of said recording head, a first differential device having two input elements mechanically connected to be driven by said first and second members respectively and an output element connected to drive said second generator, and a second differential device having input elements connected to be driven by said second and third members and an output element connected to drive said third generator.

2. In combination, a plural channel recording head having a plurality of coils for recording alternating voltages in corresponding channels on a magnetic tape, a mechanical curve follower having a first member driven at a speed proportional to the contouring speed of said curve follower, a tape driving capstan driven by said member, a device for resolving the motion of said curve follower into components comprising a second member mounted for longitudinal movement and connected to be driven by said curve follower at a speed proportional to the speed of a first component of its contouring motion and a third member mounted for movement in a transverse direction with respect to said longitudinal movement and connected to be driven by said curve follower at a speed proportional to the speed of a component of its contouring motion perpendicularly disposed with respect to said first component, a first alternating voltage generator driven by said first member for producing a reference alternating voltage having a frequency proportional to said contouring speed, a first mechanical differential device having two input elements connected respectively to said first and second members and an output element, a second alternating voltage generator connected to be driven by said output element for producing an alternating signal control voltage having a phase relationship to said reference voltage proportional to the speed of said first component and electrically connected to a second of said recording head coils, a second mechanical differential device having first and second input elements connected respectively to said first and third members and an output element and a third alternating voltage generator connected to be driven by said output element of said second differential device for producing a second alternating signal control voltage having a phase relationship to said reference voltage proportional to the speed of said second component and electrically connected to a third of said recording head coils.

3. In combination, a plural channel recording head having a plurality of coils for recording alternating voltages in corresponding channels on a magnetic tape, a tape driving capstan, a mechanical curve follower having a propelling motor, a first shaft driven by said motor and connected to drive said capstan at a speed proportional to the contouring speed of said curve follower, a first sine wave alternating voltage generator connected to be driven by said shaft for generating and supplying an alternating reference voltage to a first of said recording head coils, a device for resolving the contouring motion of said curve follower into components comprising a second shaft driven by said curve follower at a speed proportional to the speed of one component of said contouring motion and a third shaft driven by said curve follower at a speed proportional to the speed of a second component disposed perpendicular to said first component, second and third sine wave alternating voltage generators electrically connected to corresponding recording coils of said recording head, a first mechanical differential device having an input shaft mechanically connected to said first shaft, a second input shaft mechanically connected to said second shaft and an output shaft mechanically connected to drive said record sine wave generator, and a second mechanical differential device having an input shaft connected to be driven by said first shaft, a second input connected to be driven by said third shaft and an output shaft connected to drive said third generator.

References Cited in the file of this patent
UNITED STATES PATENTS 2,537,770  Livingston _____ Jan. 9, 1951